United States Patent [19]

Gray

[11] 4,323,134

[45] Apr. 6, 1982

[54] VEHICLE SPEED CONTROL CIRCUIT

[75] Inventor: Larry O. Gray, Greens Fork, Ind.

[73] Assignee: Dana Corporation, Toledo, Ohio

[21] Appl. No.: 16,020

[22] Filed: Feb. 28, 1979

[51] Int. Cl.³ .............................................. B60K 31/00
[52] U.S. Cl. ..................................................... 180/176
[58] Field of Search ......................... 180/170, 175–177, 180/179; 123/102 R, 103 R, 103 C, 103 E, 352, 389, 382, 340, 341

[56] References Cited

U.S. PATENT DOCUMENTS

| | | | |
|---|---|---|---|
| Re. 27,324 | 3/1972 | Granger et al. | 180/176 |
| 3,441,104 | 4/1969 | Hagler | 180/177 |
| 3,575,256 | 4/1971 | Jania et al. | 123/340 X |
| 3,648,798 | 3/1972 | Jania | 123/102 X |
| 3,705,639 | 12/1972 | Colling et al. | 123/102 X |
| 3,820,624 | 6/1974 | Sakakibara | 123/102 X |
| 3,910,646 | 10/1975 | Grix | 303/100 |
| 3,946,707 | 3/1976 | Gray | 180/176 X |
| 3,952,829 | 4/1976 | Gray | 180/177 X |
| 4,083,423 | 4/1978 | Williams et al. | 180/179 |
| 4,142,612 | 3/1979 | Riddel | 123/341 X |
| 4,190,026 | 2/1980 | Sakakibara | 180/179 |

*Primary Examiner*—Joseph F. Peters, Jr.
*Assistant Examiner*—D. W. Underwood
*Attorney, Agent, or Firm*—Wilson, Fraser, Barker & Clemens

[57] ABSTRACT

There is disclosed an apparatus for automatically maintaining the speed of a vehicle at a desired speed as selected by the vehicle operator. The apparatus includes one feedback loop for monitoring the actual vehicle speed and another feedback loop for monitoring the engine load. The engine load feedback loop enables the speed control to anticipate the effects of changes in road speed so as to minimize or eliminate undershoot or overshoot of the control system. A signal representing the actual vehicle speed is combined with a signal representing the engine load to generate a composite feedback signal to a comparator circuit. The comparator circuit compares the feedback signal with a signal representing the desired vehicle speed and generates control signals for maintaining the speed of the vehicle at the desired speed.

9 Claims, 1 Drawing Figure

VEHICLE SPEED CONTROL CIRCUIT

BACKGROUND OF THE INVENTION

1. Field of the Invention

This invention relates in general to a vehicle speed control apparatus and in particular to a speed control apparatus which utilizes vehicle speed and engine load feedback to maintain the vehicle at an operator selected desired road speed.

2. Description of the Prior Art

Early devices for controlling the speed of a vehicle were typically comprised of complex mechanical controls having a large number of interrelated moving parts. These mechanical speed controls were expensive to manufacture and difficult to maintain in an accurate operating condition.

The problems associated with the mechanical devices were overcome by the use of an electronic control device. At a comparable cost, the electronic device could be made more accurate and more reliable than the mechanical device.

Early electronic speed controls were typically closed-loop systems having a single feedback loop. In this type of control system, a feedback signal representing the actual vehicle speed was compared to a signal representing the desired vehicle speed to control the vehicle throttle and maintain the vehicle speed at the desired value. However, these single feedback loop systems presented several problems with respect to hunting, overshooting and undershooting of the control system.

One attempt to minimize the hunting, overshooting and undershooting effects of single feedback loop systems was to provide a second feedback loop which monitored the position of the vehicle throttle in order to anticipate changes in vehicle speed. A feedback signal, representing the throttle position, was utilized in conjunction with the actual speed signal and the desired speed signal to maintain the vehicle speed at the desired value without undue oscillations and hunting effects. Such control systems are disclosed in U.S. Pat. Nos. 3,575,256; 3,648,798; and 3,705,639.

However, this type of control system had some associated problems. The system typically required a potentiometer to be connected to the vehicle throttle linkage for monitoring the throttle position. Thus, the correct adjustment of the throttle linkage was an important requirement.

Another attempt to minimize the hunting, overshooting and undershooting effects was a speed control system disclosed in U.S. Pat. No. 3,820,624. In this system, a slightly delayed synchronous pulse corresponding to the actual vehicle speed signal was compared with an actual speed pulse converted from the actual speed signal. A speed acceleration-deceleration compensating circuit temporarily adjusted the desired vehicle speed signal in response to the width difference between the synchronous pulse and the actual speed pulse. This temporary adjustment reduced overshooting and undershooting of the control system. However, this system was relatively complex and therefore expensive to manufacture.

SUMMARY OF THE INVENTION

The present invention concerns a speed control circuit for automatically maintaining the speed of a vehicle at a desired speed with a minimal amount of hunting, overshooting and undershooting of the control system. In addition to providing a feedback path for monitoring the actual vehicle speed, the present invention also provides a feedback path for monitoring the engine load. The engine load feedback loop replaces the throttle position feedback loop of the prior art devices and therefore eliminates the associated problems of throttle linkage adjustments. The engine load feedback loop enables the speed control to anticipate the effects of changes in road speed so as to minimize or eliminate undershoot or overshoot of the control system.

The present invention utilizes a vacuum transducer connected to the engine intake manifold vacuum for generating a signal representing the load on the vehicle engine. The engine load signal is combined with a signal representing the actual vehicle speed to generate a composite feedback signal to a comparator circuit. The comparator circuit is responsive to the feedback signal and a signal representing the desired vehicle speed for generating control signals to maintain the speed of the vehicle at the desired speed.

It is an object of the present invention to maintain the speed of the vehicle at a desired speed with minimal hunting, overshooting and undershooting of the control system.

DESCRIPTION OF THE PREFERRED EMBODIMENT

Figure 1:
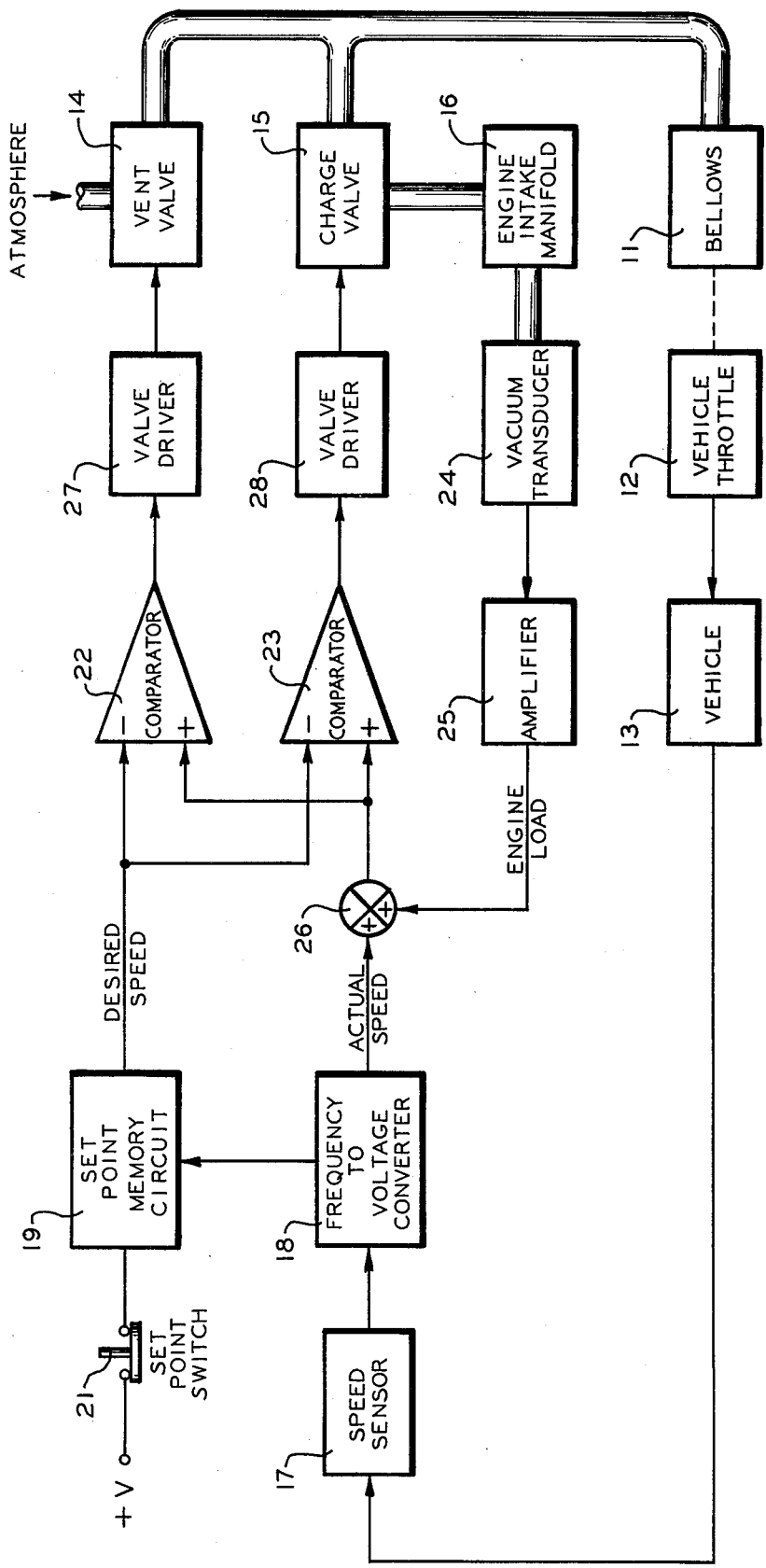
FIG. 1 is a block diagram of a vehicle speed control system according to the present invention.

Referring to FIG. 1, there is shown a block diagram of a vehicle speed control system according to the present invention. This system can be utilized to automatically maintain the speed of a vehicle at an operator selected desired speed. As will be discussed, the speed control includes a pair of feedback loops for monitoring both the actual vehicle speed and the load of the associated vehicle engine.

A bellows 11 is mechanically connected to a vehicle throttle 12 and operates to position the throttle 12 to control the speed of an associated vehicle 13. The bellows 11 is controlled by a vent valve 14 and a charge valve 15. The vent valve 14 provides selective communication between the bellows 11 and the atmosphere and is typically opened when the actual vehicle speed is above the desired vehicle speed so as to expand the bellows and decrease the position of the throttle 12. The charge valve 15 provides selective communication between the bellows 11 and a source of vacuum which is typically an engine intake manifold 16. The charge valve 15 is opened when the actual speed is below the desired speed so as to collapse the bellows and increase the position of the throttle 12.

The speed of the vehicle 13 is monitored by a speed sensor 17 which detects the rotational velocity of an element of the vehicle 13 which is moving at a speed proportional to the road speed of the vehicle. The speed sensor 17 generates a pulsed output signal having a frequency proportional to the instantaneous vehicle road speed. The pulsed output signal is supplied to a frequency to voltage converter 18 which converts the pulsed signal into a D.C. voltage signal having a magnitude proportional to the actual vehicle speed. Any suitable speed sensor and voltage converter can be used such as those disclosed in U.S. Pat. No. 4,083,423 entitled "Vehicle Road Speed Signal Source" and assigned to the assignee of the present invention.

The actual vehicle speed signal generated by the converter 18 is supplied to a set point memory circuit 19. A set point switch 21 is connected between a +V power supply (not shown) and the memory circuit 19. When activated, the memory circuit 19 functions to generate a D.C. voltage signal representing the desired vehicle speed as selected by the vehicle operator. The vehicle operator typically activates the memory circuit 19 by momentarily depressing the set point switch 21 when the vehicle is traveling at the desired speed. When the switch 21 is depressed, the circuit 19 samples and stores the magnitude of the actual speed signal at that moment. The stored signal is generated as the desired speed signal and is supplied to the inverting inputs of a pair of comparators 22 and 23. A set point memory circuit which can be used as disclosed in U.S. Pat. No. 3,952,829 entitled "Vehicle Speed Control Circuit" and assigned to the assignee of the present invention.

In addition to providing a feedback loop for monitoring the actual speed of the vehicle, the speed control system according to the present invention provides a feedback loop for monitoring the load on the vehicle engine. The engine load feedback loop functions to anticipate the effect of changes in road speed so as to minimize or eliminate undershoot or overshoot of the control system. This provides a speed control system which maintains a close correlation between the actual speed of the vehicle and the desired speed of the vehicle without undue oscillations and hunting effects.

One engine parameter which is representative of the load on an internal combustion engine is the vacuum of the associated intake manifold. Since the intake manifold vacuum decreases as the engine load increases, the engine load is inversely related to the manifold vacuum. Thus, in the preferred embodiment of the present invention, a vacuum transducer 24 is connected to the engine intake manifold 16 and generates a D.C. voltage output signal proportional to the intake manifold vacuum. The transducer output signal is supplied to an inverting amplifier 25 which inverts and amplifies the signal to generate a D.C. voltage output signal proportional to the engine load. The vacuum transducer 24 can be a Model AB transducer manufactured by Tyco. The amplifier can be a CA 3140S amplifier manufactured by RCA.

The engine load signal generated by the amplifier 25 is supplied to one input of a summing junction 26. Another input of the junction 26 is connected to receive the actual vehicle speed signal from the converter 18. The summing junction combines the actual speed signal and the engine load signal and generates a composite feedback signal to the non-inverting inputs of the comparators 22 and 23.

The comparators 22 and 23 generate control signals to a pair of valve drivers 27 and 28 respectively which in turn are connected to drive the vent valve 14 and the charge valve 15 respectively. Typically, the vent valve 14 is a normally open valve while the charge valve 15 is a normally closed valve.

In operation, the comparators 22 and 23 and the valve drivers 27 and 28 function to control the valves 14 and 15 respectively so as to maintain the actual speed of the vehicle at the desired valve. When the composite feedback signal magnitude at the non-inverting comparator inputs is less than the desired speed signal magnitude at the inverting comparator inputs, the actual vehicle speed is less than the desired speed, and the comparators 22 and 23 enable the valve drivers 27 and 28 respectively. The valve drivers then activate the respective valves such that the vent valve closes and the charge valve opens. This causes the bellows 11 to partially collapse and increase the position of the vehicle throttle 12 which in turn increases the speed of the vehicle. When the signal magnitude at the non-inverting comparator inputs is greater than the signal magnitude at the inverting inputs, the comparators 22 and 23 function to disable the respective valve drivers. The vent valve opens and the charge valve closes to cause the bellows 11 to partially expand and decrease the throttle position.

The engine load feedback loop enables the speed control to anticipate the effects of large changes in road speed so as to minimize or eliminate undershoot or overshoot. For example, if the actual vehicle speed is low compared with the desired speed, such as in resume operation, the throttle will be increased to the maximum position. The engine load and the engine load signal both increase generating a signal representing an apparent increase in vehicle speed to the comparators 22 and 23. The comparators respond by reducing the throttle position before the actual speed equals the desired speed such that the vehicle attains the desired speed with a minimal amount of overshoot. The control performs a similar function when the throttle is released from a high speed position to allow the vehicle to slow to the desired speed with minimal undershoot.

Although not shown in FIG. 1, speed control systems typically include a means for providing a dead band over which no control action takes place. For example, the dead band can be a speed range of one kilometer per hour centered at the desired speed. When the vehicle speed is in this dead band, both the charge and vent valves are closed. Thus, the vent valve is closed when the vehicle speed is in or below the dead band, while the charge valve is closed when the vehicle speed is in or above the dead band. It should be noted that, depending on the type of control signals required to actuate the valve drivers 27 and 28, it may be desirous to reverse the connections to the comparator inputs. Thus, the desired speed signal can be supplied to the non-inverting input, while the composite feedback signal can be supplied to the inverting input. A more detailed description of the comparators, valve drivers and a dead band means can be found in U.S. Pat. No. 3,946,707 entitled "Electronic Vehicle Speed Control" and assigned to the assignee of the present invention.

In summary, the present invention concerns a speed control circuit for a vehicle having an engine and an associated throttle control means. The speed control circuit functions to automatically maintain the speed of the vehicle at a desired speed. The circuit includes a source of a signal representing the actual speed of the vehicle, a source of a signal representing the desired speed of the vehicle, and a source of a signal representing the load on the engine of the vehicle. A means is responsive to the actual speed signal, the desired speed signal and the engine load signal for generating a control signal to the throttle control means to maintain the speed of the vehicle at the desired road speed. Typically, the engine load signal source includes a transducer means responsive to the vacuum of the engine intake manifold for generating a transducer output signal representing the engine load.

In accordance with the provisions of the patent statutes, the principle and mode of operation of the invention have been explained in its preferred embodiment.

However, it must be understood that the invention can be practiced otherwise than as specifically illustrated and described without departing from its spirit or scope.

What I claim is:

1. In a vehicle having an engine and an associated throttle control means, a speed control circuit for automatically maintaining the speed of the vehicle at a desired speed, comprising:
   a source of an electrical signal representing the actual speed of the vehicle;
   a source of an electrical signal representing the desired speed of the vehicle;
   a source of an electrical signal representing the load on the engine of the vehicle; and
   means responsive to said actual speed signal, said desired speed signal and said engine load signal for generating a control signal to the throttle control means to maintain the speed of the vehicle at the desired road speed, said control signal generating means including means responsive to said actual speed signal and engine load signal for generating a composite feedback signal and a comparator means responsive to said composite feedback signal and said desired speed signal for generating said control signal.

2. A speed control circuit according to claim 1 wherein the engine includes an associated intake manifold and said engine load signal source includes a transducer means responsive to the magnitude of the intake manifold vacuum pressure for generating a transducer output signal proportional to the engine load, and means responsive to said transducer output signal for generating said engine load signal.

3. A speed control circuit according to claim 2 wherein said engine load signal source includes an inverting amplifier means responsive to said transducer output signal for generating said engine load signal.

4. A speed control circuit according to claim 1 wherein said feedback signal generating means generates said feedback signal with a magnitude equal to the sum of the magnitudes of said actual speed signal and said engine load signal.

5. A speed control circuit according to claim 1 wherein said desired speed signal source includes a means actuated by the vehicle operator when the vehicle reaches the desired speed and responsive to said actual speed signal for generating said desired speed signal.

6. In a vehicle having an engine including an associated intake manifold and a throttle control means, a speed control circuit for automatically maintaining the speed of the vehicle at a desired speed, comprising:
   a source of a signal representing the actual speed of the vehicle;
   a source of a signal representing the desired speed of the vehicle;
   a source of a signal representing the magnitude of the intake manifold vacuum pressure;
   means responsive to said actual speed signal and said manifold vacuum pressure signal for generating a composite feedback signal; and
   means responsive to said desired speed signal and said composite feedback signal for generating a control signal to the throttle control means to maintain the speed of the vehicle at the desired road speed.

7. A speed control circuit according to claim 6 wherein said intake manifold vacuum pressure signal source includes a vacuum transducer.

8. A speed control circuit according to claim 6 wherein said feedback signal generating means generates said feedback signal with a magnitude equal to the sum of the magnitudes of said actual speed signal and said manifold vacuum pressure signal.

9. A speed control circuit according to claim 6 wherein said control signal generating means includes a comparator circuit responsive to the magnitude of said desired speed signal and said feedback signal for generating said control signal.

* * * * *